(12) United States Patent
Fahs et al.

(10) Patent No.: US 10,013,276 B2
(45) Date of Patent: Jul. 3, 2018

(54) SYSTEM AND METHOD FOR LIVE MIGRATION OF A VIRTUALIZED NETWORKING STACK

(71) Applicant: Google LLC, Mountain View, CA (US)

(72) Inventors: Brian Matthew Fahs, San Jose, CA (US); Jinnah Dylan Hosein, Menlo Park, CA (US); Venkatesh Babu Chitlur Srinivasa, San Ramon, CA (US); Guy Shefner, Duvall, WA (US); Roy Donald Bryant, Mountain View, CA (US); Uday Ramakrishna Naik, Fremont, CA (US); Francis E. Swiderski, Mountain View, CA (US); Nan Hua, Cupertino, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 14/310,492

(22) Filed: Jun. 20, 2014

(65) Prior Publication Data
US 2015/0370596 A1   Dec. 24, 2015

(51) Int. Cl.
G06F 9/46 (2006.01)
G06F 9/455 (2018.01)

(52) U.S. Cl.
CPC ............ G06F 9/46 (2013.01); G06F 9/45558 (2013.01); *G06F 2009/4557* (2013.01)

(58) Field of Classification Search
CPC . G06F 9/45558; G06F 9/46; G06F 2009/4557
See application file for complete search history.

(56) References Cited

U.S. PATENT DOCUMENTS 6,698,017 B1 * 2/2004 Adamovits et al. .......... 717/168
7,363,365 B2    4/2008 Ocko et al.
(Continued)

FOREIGN PATENT DOCUMENTS

CN    101465812 A    6/2009
EP    1617331 A2    1/2006
(Continued)

OTHER PUBLICATIONS

International Search Report for Application No. PCT/US2015/036427 dated Oct. 12, 2015.
(Continued)

*Primary Examiner* — Li B Zhen
*Assistant Examiner* — Amir Soltanzadeh
(74) *Attorney, Agent, or Firm* — Lerner, David, Littenberg, Krumholz & Mentlik, LLP

(57) ABSTRACT

A method and apparatus are provided in which a source and target perform bidirectional forwarding of traffic while a migration guest is being transferred from the source to the target. In some examples, the migration guest is exposed to the impending migration and takes an action in response. A virtual network programming controller informs other devices in the network of the change, such that those devices may communicate directly with the migration guest on the target host. According to some examples, an "other" virtual network device in communication with the controller and the target host facilitates the seamless migration. In such examples, the forwarding may be performed only until the other virtual machine receives an incoming packet from the target host, and then the other virtual machine resumes communication with the migration guest on the target host.

17 Claims, 6 Drawing Sheets

(56) References Cited

U.S. PATENT DOCUMENTS

| | | |
|---|---|---|
| 7,484,208 B1 | 1/2009 | Nelson |
| 8,438,256 B2 | 5/2013 | Rogel et al. |
| 8,576,881 B2 | 11/2013 | Jungck et al. |
| 8,625,597 B2 | 1/2014 | Berman |
| 8,635,344 B2 | 1/2014 | Yengalasetti et al. |
| 2007/0180436 A1* | 8/2007 | Travostino et al. ......... 717/138 |
| 2007/0204265 A1* | 8/2007 | Oshins ............... G06F 9/4856 718/1 |
| 2009/0007106 A1* | 1/2009 | Araujo, Jr. ............ G06F 9/54 718/1 |
| 2010/0306381 A1 | 12/2010 | Lublin et al. |
| 2012/0017031 A1 | 1/2012 | Mashtizadeh et al. |
| 2012/0110181 A1 | 5/2012 | Tsirkin |
| 2012/0159473 A1 | 6/2012 | Tsirkin |
| 2012/0324443 A1 | 12/2012 | Low et al. |
| 2013/0031544 A1* | 1/2013 | Sridharan et al. ............ 718/1 |
| 2013/0238786 A1 | 9/2013 | Khesin |
| 2013/0275592 A1 | 10/2013 | Xu et al. |
| 2013/0305242 A1* | 11/2013 | Wang ............... G06F 9/45558 718/1 |
| 2013/0339516 A1 | 12/2013 | Chauhan et al. |
| 2014/0101489 A1 | 4/2014 | Yang |
| 2014/0223013 A1* | 8/2014 | Gaglianello ....... H04L 61/2084 709/226 |
| 2014/0280738 A1* | 9/2014 | Kolker ............... H04L 12/462 709/218 |
| 2014/0289399 A1* | 9/2014 | Shimokuni ......... G06F 11/301 709/224 |

FOREIGN PATENT DOCUMENTS

| | | |
|---|---|---|
| JP | 2012-175190 A | 9/2012 |
| JP | 2014067322 A | 4/2014 |
| KR | 20140043800 A | 4/2014 |
| WO | 2013006801 A2 | 1/2013 |
| WO | 2013015825 A1 | 1/2013 |
| WO | 2014011927 A1 | 1/2014 |

OTHER PUBLICATIONS

Office Action for Korean Patent Application No. 10-2016-7033015 dated Aug. 17, 2017.

Examination Report No. 1 for Australian Patent Application No. 2015277109, dated Jun. 30, 2017. 3 pages.

Examination Report No. 2 for Australian Patent Application No. 2015277109 dated Sep. 7, 2017. 3 pages.

Office Action for Japanese Patent Application No. 2016-567394 dated Nov. 28, 2017.

Examination Report No. 3 for Australian Patent Application No. 2015277109 dated Dec. 12, 2017. 3 pages.

Ajila, Samuel A. et al. "Efficient Live Wide Area VM Migration with IP Address Change Using Type II Hypervisor." 2013 IEEE 14th International Conference on Information Reuse & Integration (IRI). IEEE. Aug. 14, 2013 (Aug. 14, 2013). pp. 372-379. XP032513523. DOI: 10.1109/IRI.2013.6642495.

Extended European Search Report dated Mar. 12, 2018, for European Patent Application No. 15810302.8. 9 pages.

* cited by examiner

SYSTEM AND METHOD FOR LIVE MIGRATION OF A VIRTUALIZED NETWORKING STACK

BACKGROUND

Live migration is the act of moving an actively running virtual machine from one host machine to another, preserving virtual device connectivity, network connections, and virtual machine health status reporting. During the migration, performance may be affected by, for example, pausing the virtual machine to copy memory or by establishing connections with the virtual machine's new host.

SUMMARY

One aspect of the disclosure provides a method of facilitating live migration by a virtualized network device, comprising sending, by the virtualized network device, packets to a migration guest on a source host, the packets to be forwarded by the source host to a target host, receiving, through the source host, packets from the migration guest on the target host, determining, by the virtualized network device, whether a migration of the migration guest from the source host to the target host is complete, and sending packets directly from the virtualized network device to the migration guest on the target host when it is determined that the migration is complete. Determining whether a migration of the migration guest is complete may include receiving, at the virtualized network device, one or more packets directly from the guest on the target host, and identifying, based on the received one or more packets, that migration is complete.

Another aspect of the disclosure provides a system, comprising a source host, a migration guest running on the source host, a target host in communication with the source host, and an other virtualized network device in communication with the migration guest on the source host. The source host is configured to forward traffic received from the other network device to the target host, and to forward traffic received from the target host to the other network device. The target host is configured to send packets directly to the other network device upon completion of migration of the migration guest. The other network device is configured to determine when a packet is received directly from the target host, and to send packets directly to the migration guest on the target host in response. The system may further include a network controller configured to provide a token to the other virtualized network device for communicating directly with the migration guest on the target host. In some examples, the migration guest is notified of the migration prior to a start of the migration, and may be configured to change its state in response to the notification. For example, the migration guest may place itself into a mode wherein it closes out existing connections and denies future processing requests. As another example, the migration guest may communicate with another system, the communication causing the another system to direct future processing requests to other resources on the network for the duration of the migration.

Yet another aspect of the disclosure provides a method, comprising receiving, at a migration guest on a source host, an indication that the migration guest will be migrated from the source host to a target host. The migration guest takes a predetermined action in response to receiving the indication. Further, the migration guest is transferred from the source to the target. The source host forwards traffic received from other network devices for the migration guest on the source host to the target host, and also forwards traffic received from the target host on behalf of the migration guest to the other network devices.

DETAILED DESCRIPTION

Overview

Figure 1:
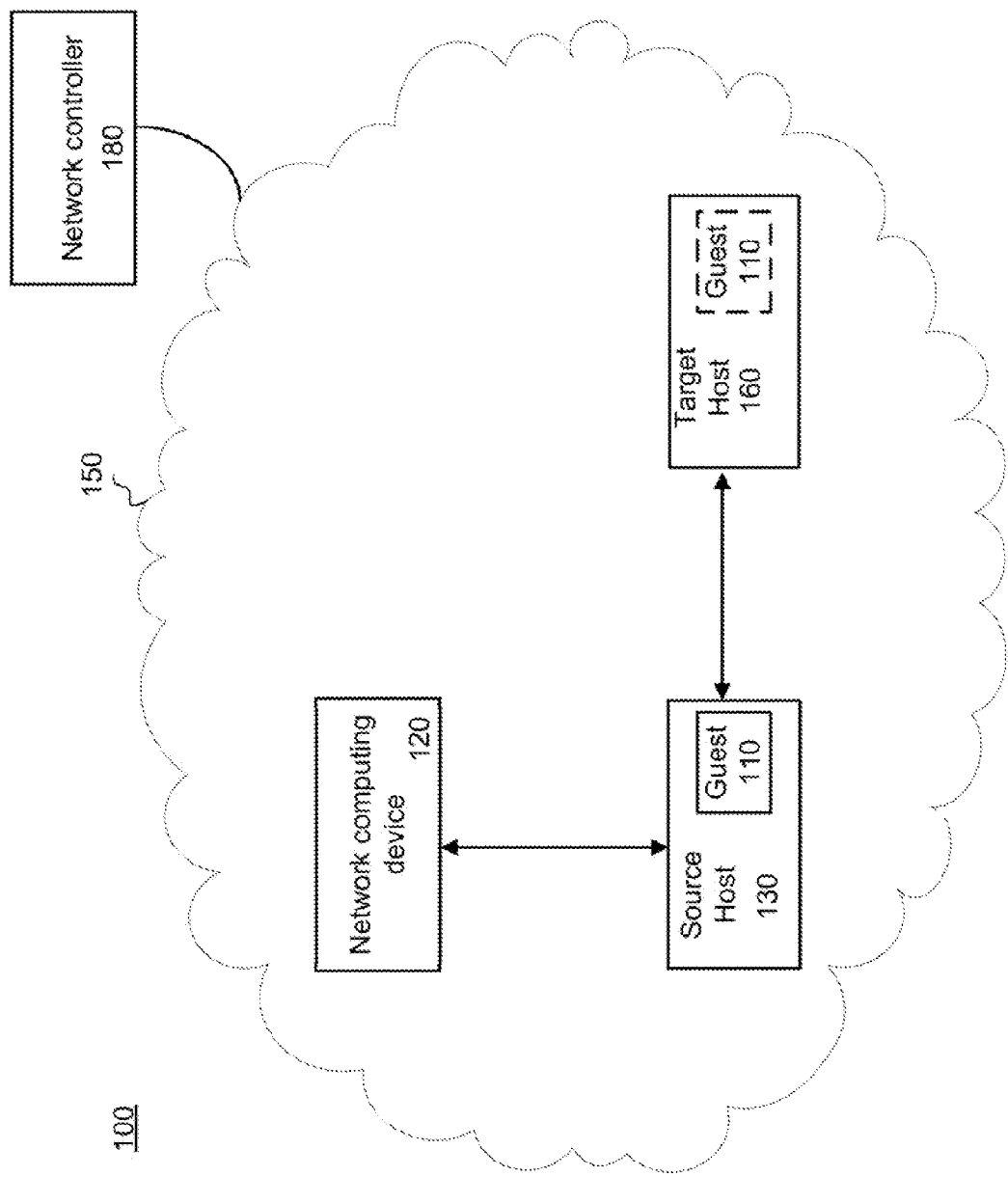
FIG. 1 is an example system according to aspects of the disclosure.

This disclosure provides a system and method for live migration of a virtualized networking stack.

The live migration takes place without interrupting a network connection between a first virtualized or non-virtualized network computing device and the migrating virtual networking stack. The first virtualized or non-virtualized network computing device may be a virtual machine, a switch, a host, or any other network device. The virtual networking stack may be a virtual machine, linux container, or any other type of virtual networking stack. In the following examples, the first virtualized or non-virtualized network computing device is referred to as a first device, and the migrating virtual networking stack is referred to as a virtual machine, but it should be understood that these examples are not limiting. Moreover, it should be understood that these are merely examples, and the concepts described may be applied in various scenarios. For example, multiple first devices may communicate with the migrating virtual machine using the techniques described below.

The first device communicates with the virtual machine residing on a source host. The first device continues to communicate with the virtual machine on the source host during migration. Until migration is complete, the source virtual machine and target virtual machine perform forwarding (e.g., bidirectional or unidirectional forwarding) of proxied traffic. For example, the source virtual machine proxies all incoming traffic from the first device and forwards it to the target virtual machine. The target virtual machine is configured to accept the proxied ingress traffic, and also to proxy all egress traffic through the source virtual machine. Such bidirectional forwarding may continue from a time when the virtual machine moves from the source to the target until affected nodes on the network are reprogrammed. A centralized virtual network programming controller informs the first device that the virtual machine has migrated to the target host, such that the first device may resume communication with the virtual machine on the target host. Moreover, the controller may also inform the rest of the network of the change.

According to one example, as an alternative or in addition to proxying all traffic at the source and performing bidirectional forwarding, an "other" virtual machine (VM) in communication with the controller and the target host facilitates the seamless migration. For example, the target VM host contacts the controller to subscribe to network updates.

The controller provides the other VM with a token for communicating directly with the VM on the target host. The other VM, source host, and target host may perform triangular routing from a time when the virtual machine is transferred to the target host until, for example, the network is updated. For example, the other VM sends traffic to the source VM host, which is forwarded to the target VM host, until the other VM receives an incoming packet from the target VM host. At this point, using the token received from the controller to authenticate and specify the egress path, the other VM sends packets directly to the VM on the target host. As another example, upon receiving a packet from an unrecognized sender, the other VM host queries the controller so that it can switch to sending packets directly to the target VM.

To support smooth transitioning from the source host to the target host in either of the examples above, one or more rules may be installed on network devices such as the source and/or the host of the "other" VM. For example, the rules may be installed by the controller. The rules may be specific to particular phases of the migration, such as brownout (e.g., when migration target is starting and virtual machine state is transferring from source host to target host), blackout (e.g., when the virtual machine is paused so the remaining VM state can be moved from source to target in preparation for VM resuming on target), post-blackout (e.g., when migration is complete and the target is responsible for all processing), and cancellation (e.g., all migration-related set-ups are removed).

During brownout, the virtual machine resides on the source host. The migration source can receive and send traffic to any other virtual machine (VM). Also, any other VM can receive traffic from the migration source; any other VM will send traffic only to the migration source. The controller will also change the migration source's forwarding table and install a migration table on the migration source for forwarding traffic. The source host and target host both have host agent processes running locally, or as part of the virtual machine manager process, that aid in the reprogramming of the network. The migration source's host agent is enabled to switch from forwarding traffic locally to forwarding to the migration target.

During blackout, any network state that needs to be migrated from the source to the target is migrated (e.g., stateful firewall state). Only the migration source's host agent is involved in doing the switching. The controller does not need to do anything. While in some implementations the switching may be performed at a start of blackout period, in other implementations traffic is not forwarded until post-blackout in case migration is canceled before or during blackout.

During post-blackout, the controller provides routes that are direct to the migration target. In addition, traffic from the migration source is still forwarded to the migration target. For example, the source host and target host may perform bidirectional forwarding, unidirectional forwarding, or triangular routing. As a result, most flows on the migration source will be un-installed, except for the migration forwarding flow. Moreover, in the case of triangular routing, responses from the migration target will be sent directly to the first device, which can then communicate directly with the virtual machine on the target host, as opposed to forwarding traffic through the source host.

Cancellation occurs when the migration is canceled. For example, during brownout or blackout the target host may crash, or some other event may occur, which results in cancellation of the migration. During cancellation, the controller removes all flows set up for migration. For example, rules on first devices enabling them to receive packets from either the source host or the target host would be reprogrammed to support only the rule corresponding to the source. Any network programming on the target host is removed and any forwarding-related programming on the source host is removed.

According to some examples, the duration of the blackout may be reduced by starting execution at the target before the entire virtual machine state has been transferred. For example, during a brownout phase the virtual machine state may be pre-copied, followed by a blackout where execution of the virtual machine tasks is transferred to the target host and the remaining state may or may not be transferred. Moreover, a post-copy brownout phase may exist where the remaining state is copied after the blackout.

One aspect of the disclosure provides for exposing the impending live migration to guest VMs, thereby enabling the guest VMs to take an action. One such action may be changing the health state of the guest VMs prior to their migration. For example, the guest VM may place itself into a "lame duck" state, wherein it communicates to other systems that it is not accepting new tasks or connections, but completes any tasks that are already underway. In this regard, the guest VMs can, for example, remove themselves from load-balancing pools and close out existing connections. This may facilitate load balancing throughout the networks. Moreover, this may be especially helpful to customers that are sensitive to blackout delay, such as online gaming systems.

Example Systems

FIG. 1 illustrates an example system 100, in which an actively running guest is being migrated from a source host to a target host. As shown, network computing device 120, source host 130, and target host 160 are elements of network 150. The network also include network controller 180, which communicates with one or more of the devices in the network 150.

The network 150 may be a datacenter, a load-balanced server farm, or any other type of computing environment, including a backplane of interconnected peripherals or a system of components on a motherboard. The network 150, and intervening nodes, may comprise various configurations and protocols including the Internet, World Wide Web, intranets, virtual private networks, wide area networks, local networks, private networks using communication protocols proprietary to one or more companies, Ethernet, WiFi (such as 802.11, 802.11b, g, n, or other such standards), and HTTP, and various combinations of the foregoing.

The network controller 180 may be linked directly or indirectly to each node of the network 150, and may be used to establish connections between the nodes or to provide information to specific nodes. For example, the network controller 180 may be used to provide network updates, to facilitate the transfer of information from one node to another, etc. In some examples, the network controller 180 may store and process information about the topology of the network 150, or individual topologies of other various networks that may be connected to network 150. The network controller 180 may be, for example, a conventional or specialized network interface controller (NIC). The NIC may be implemented on and connected to the network through, for example, an expansion card, a motherboard, an Ethernet chip, or any other medium.

The network computing device 120 may be a virtualized or non-virtualized computing device. For example, the network computing device 120 may be a central processing unit (CPU), virtual machine, linux container, router, switch, or any other network device capable of sending and receiving packets. The network computing device 120 may communicate with the source host 130 and guest 110 by, for example, wired or wireless connection.

The source host 130 may be any type of computing device or system of computing devices capable of hosting the guest 110. For example, the source host 130 may include a hypervisor (not shown) with one or more virtual machines or other guests operating thereon. While only the guest 110 is shown in FIG. 1, it should be understood that multiple guests may be running on the source host 130 at any given time. In some examples, the source host 130 may be virtualized, such as in nested virtualization. For example, the source host 130 can be a virtual machine, linux container, or the like.

The target host 160, similar to the source host 130, may also be any type of computing device capable of hosting the guest 110. In some examples, the target host may be virtualized.

To initiate the live migration, the target host 160 contacts a virtual machine manager (VMM) on the source host 130. For example, a VMM task may be started on the target host 160. Such task may contact the VMM on the source host 130, including, for example, performing authentication. A blackout phase may then begin, in which the specification and state of the guest 110 is transferred from the source host 130 to the target host 160.

According to some examples, the guest 110 may take a predetermined action in response to being notified (e.g., by the target 160 or the source 130) about its impending migration. One example of such an action is changing its state, such as a health state. For example, the guest 110 may put itself into a "lame duck" state, which state may be recognized in addition to other states, such as healthy or unhealthy. In the lame duck state, the guest 110 may close out any existing connection and remove itself from load-balancing pools. For example, the guest 110 may complete pending tasks, and not accept any new tasks.

In moving the guest 110 to the target host 160, communication between the network computing device 120 and the guest 110 may be maintained, for example, through the source host 130. For example, the source host 130 may serve as a bidirectional forwarding agent between the network computing device 120 and the target host 160. The target host 160 is configured to accept proxied ingress traffic from the guest 110 on the source 130, and to proxy egress traffic through the source 130.

When migration is complete, at least one of the target 160 and the source 130 may notify the network controller 180. The network controller 180 may in turn change the physical host IP address of the guest 110 to correspond to its new location on the target host 160. As such, clients that want to communicate with the guest 110 can send packets to the proper physical host machine. Moreover, in some examples the network controller 180 may notify the network computing device 120, and other computing devices in the network 150, of the change of location of the guest 110. For example, the controller 180 may provide the network devices with the new address of the guest 110. Accordingly, the network computing device 120, and other devices, may resume communication directly with the guest 110 on the target host 160.

Once the network device 120 begins communicating with the guest 110 on the target 160, the source 130 may exit and the target 160 may tear down ingress and egress forwarding configurations. For example, forwarding rules on the source 130 and target 160 may be deleted. According to one example, the source 130 and target 160 may wait for a predetermined period of time, such as one minute, after traffic forwarded through the source 130 drops to zero before deleting the forwarding rules. This may accommodate variations in timing in updating the network devices with the new address of the guest 110 on the target 160. According to another example, a feedback-based mechanism is used, such that forwarding is only stopped when it is explicitly known that all clients have been notified of the change to the target 160.

Figure 2:
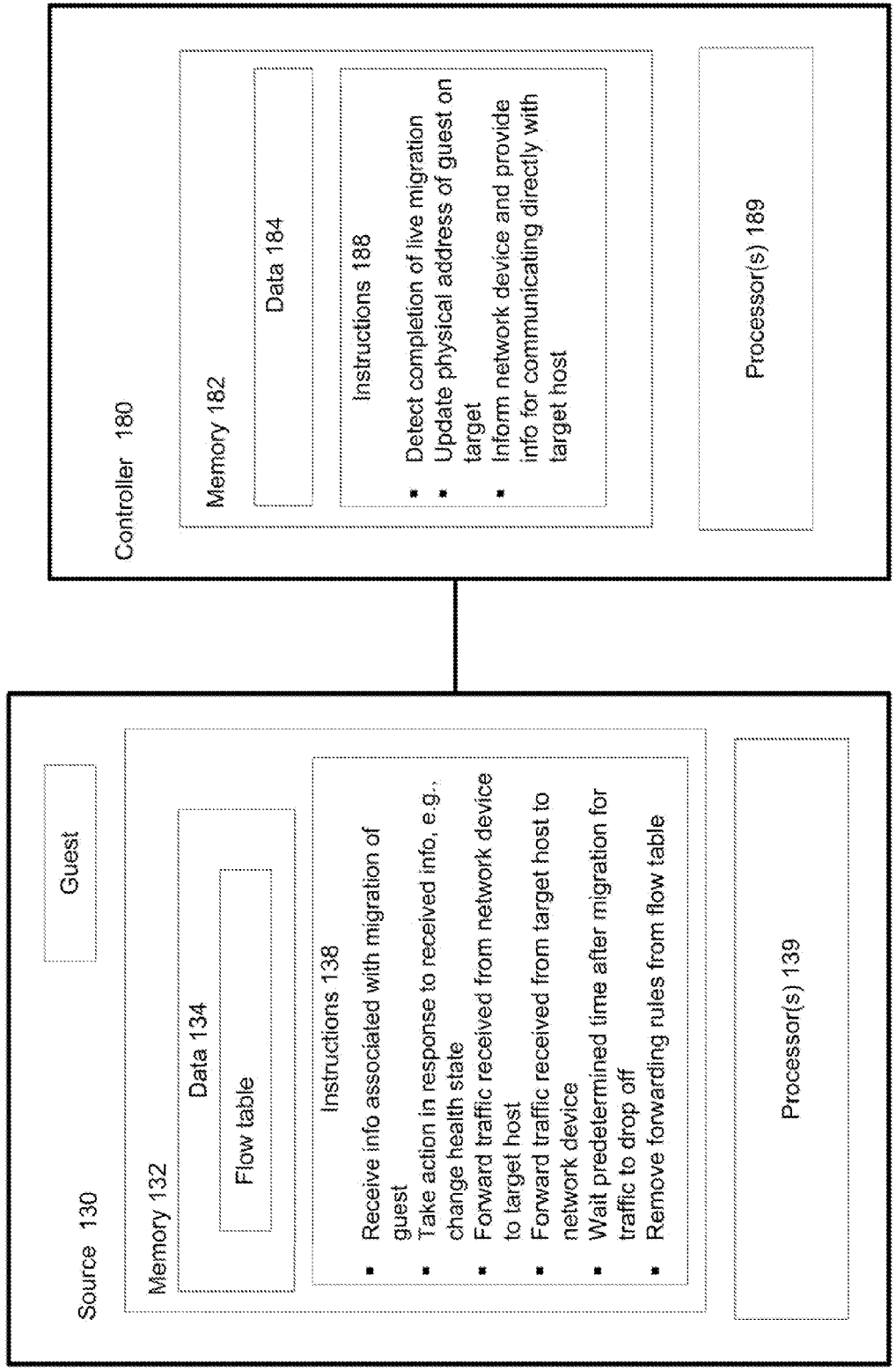
FIG. 2 is a block diagram of components of the system of FIG. 1 according to aspects of the disclosure.

FIG. 2 provides a block diagram of particular components of the system 100, including the source 130 and the controller 180.

The source 130 includes a memory 132 and one or more processors 139 in communication with the memory 132. Memory 132 stores information accessible by processor 139, including instructions 138 that may be executed by the processor 139. The memory also includes data 134 that may be retrieved, manipulated or stored by the processor. The memory may be of any type capable of storing information accessible by the processor, such as a hard-drive, memory card, ROM, RAM, DVD, CD-ROM, write-capable, and read-only memories.

The processor 139 may be any conventional processor, such as a commercially available central processing unit ("CPU") or a graphics processing unit ("GPU"). Alternatively, the processor may be a dedicated component such as an application-specific integrated circuit ("ASIC"), a field programmable gate array ("FPGA"), or other hardware-based processor. As another example, the processor 139 may be a quantum computer.

The memory 132 includes data 134 that may be retrieved, manipulated or stored by the processor in accordance with the instructions 138. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data 134 may comprise any information sufficient to identify the relevant information, such as numbers, descriptive text, proprietary codes, pointers, references to data stored in other memories (including other network locations) or information that is used by a function to calculate the relevant data.

The instructions 138 may be any set of instructions to be executed directly (such as machine code) or indirectly (such as scripts) by the processor(s) 139. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

The instructions 138 may be executed by the processor, for example, to receive information associated with migration of the guest, for example, from the migration target. In some examples, the guest may take an action in response to receiving the information. For example, the guest 110 may update its state, such as by changing its health state to a "lame duck" state. In this state, the guest may complete any pending tasks without accepting any new tasks. The instructions 138 may further provide for handling bidirectional forwarding between the network device 120 and the target 160. For example, the data 134 may include a flow table with one or more forwarding rules for handling traffic received from the network device 120 destined for the migrating guest 110, and for handling traffic received from the target 160 destined for the network device 120. The instructions 138 may even further provide for tearing down connections once migration is complete. For example, the source 130 may wait a predetermined amount of time after migration is complete for traffic to drop off, and then remove the bidirectional forwarding rules from the flow table. As another example, forwarding rules set upon the source 130 may be torn down once all network devices communicating with the migrated guest 110 confirm that they have switched over to communicating with the target 160.

Although FIG. 2 functionally illustrates the processor 139 and memory 132 as being within the same block, it will be understood that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor 139. Similarly, the processor 139 may actually comprise a collection of processors which may or may not operate in parallel. In some examples, the memory 132 and/or the one or more processors 139 may be part of a hypervisor.

The controller 180 also includes memory 182 and one or more processors 189, similar to the source 130. The one or more processors 189 may also take any of the forms described above in connection with the source processor(s) 139. The memory 182 includes data 184 and instructions 188. The memory 182 may be any of the types and may include any of the features described above in connection with the source memory 132. The instructions 188 provide for detecting completion of live migration and for updating an address of the guest on the target host. Detection of completion of the live migration may include, for example, receiving a notification from one of the source 130 and the target 160 indicating that the migration is complete. Updating the address may include programming the target and source to prepare for migration and programming the rest of the network to be aware of the source and target. The instructions 188 may further provide for informing other network devices, such as the network device 120, that live migration is complete. This may further include providing the updated address for the guest on the target to the network devices.

Figure 3:
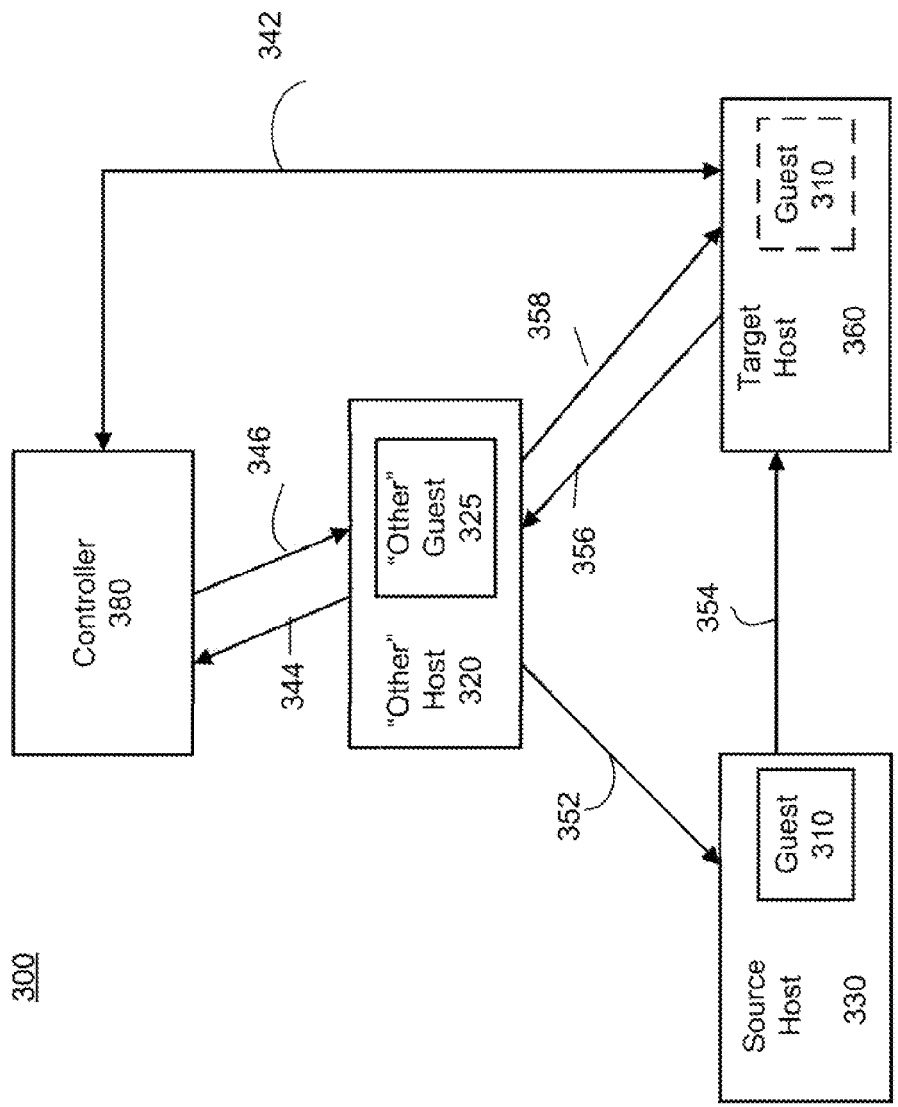
FIG. 3 is another example system according to aspects of the disclosure.

FIG. 3 illustrates another example system 300. The system 300, similar to the system 100 of FIG. 1, may include a number of connected network components, such as a source 330, target 360, and controller 380. The source 330, target 360, and controller 380 may be similar to the source 130, target 160, and controller 180 described above in connection with FIGS. 1-2.

The system 300 may further include "other" guest 325, residing on "other" host 320, communicatively coupled to the source 330, target 360, and controller 380. The other host 320 may, in conjunction with the source 330 and target 360, perform triangular routing as described above. This may be performed, for example, in addition or in the alternative to the bidirectional forwarding described above in FIG. 1. Similar to the source host and target host, the other host may be any type of virtualized or non-virtualized network device. While only one other host and other guest are shown, multiple other hosts and guests may be implemented.

In this example, the target host 360 contacts the controller 380, as shown for example by communication 342, to subscribe to network updates. In response to a lookup request 344, the controller provides the other host 320 with a token, as shown by communication 346. The token may be used for communicating directly with the guest 310 on the target host 360.

While the example of FIG. 3 illustrates performing a lookup request 344, in other examples flows for communicating with the migration guest 310 on the target host 360 may be pushed to the other hosts before forwarding needs to take place. For example, the flows may be pushed to the other hosts during brownout and/or blackout.

The other guest 325 sends traffic 352 to the source host 330, which is forwarded to the target host 360, as shown by communication 354. The source host 330 continues to forward such traffic until the other guest 325 receives an incoming packet (shown by 356) from the target host 360. When the other guest 325 receives the packet 356 from the guest 310 on the target host 360, the other guest 325 begins communicating directly with the guest 310 on the target 360, as represented by communication 358. For example, the other host 320 uses the token received from the controller 380 to authenticate and specify an egress path from the other guest 325 to the guest 310 on the target host 360. In this regard, the other guest 325 is enabled to "learn" of the new location of the guest 310 and automatically switch over to directly communicating with the guest 310 on the target 360 after receiving the first incoming packet from the guest 310 on that target 360.

Figure 4:
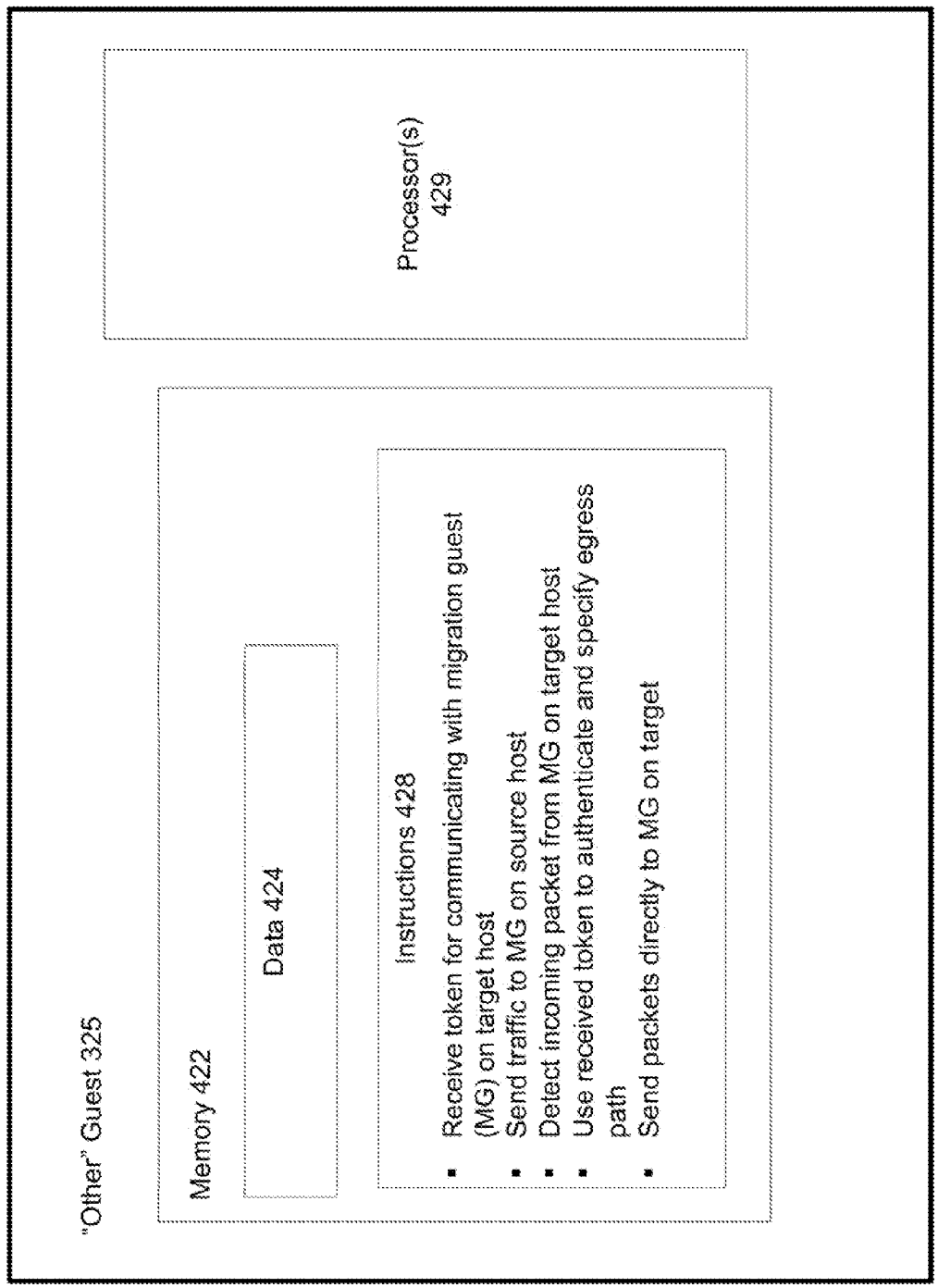
FIG. 4 is a block diagram of components of the system of FIG. 3 according to aspects of the disclosure.

FIG. 4 provides an example block diagram of the other guest 320. As mentioned above, the other guest 325 may be a virtual machine or any other virtualized networking component. The other guest 320 may run on a hypervisor residing on any host device in the network.

The other guest 325 includes memory 422, including data 424 and instruction 428, and one or more processors 429. These components may be similar to the memory and processors described above in connection with FIG. 2. The instructions 428 may provide for receiving a token for communication with the guest on the target host, sending traffic to the guest on the source host, and detecting incoming packets from the guest on the target host. When the incoming packet is detected, the instructions 428 may further provide for using the received token to authenticate and specify an egress path, and for sending packets directly to the guest on the target host over the specified egress path.

Example Methods

Figure 5:
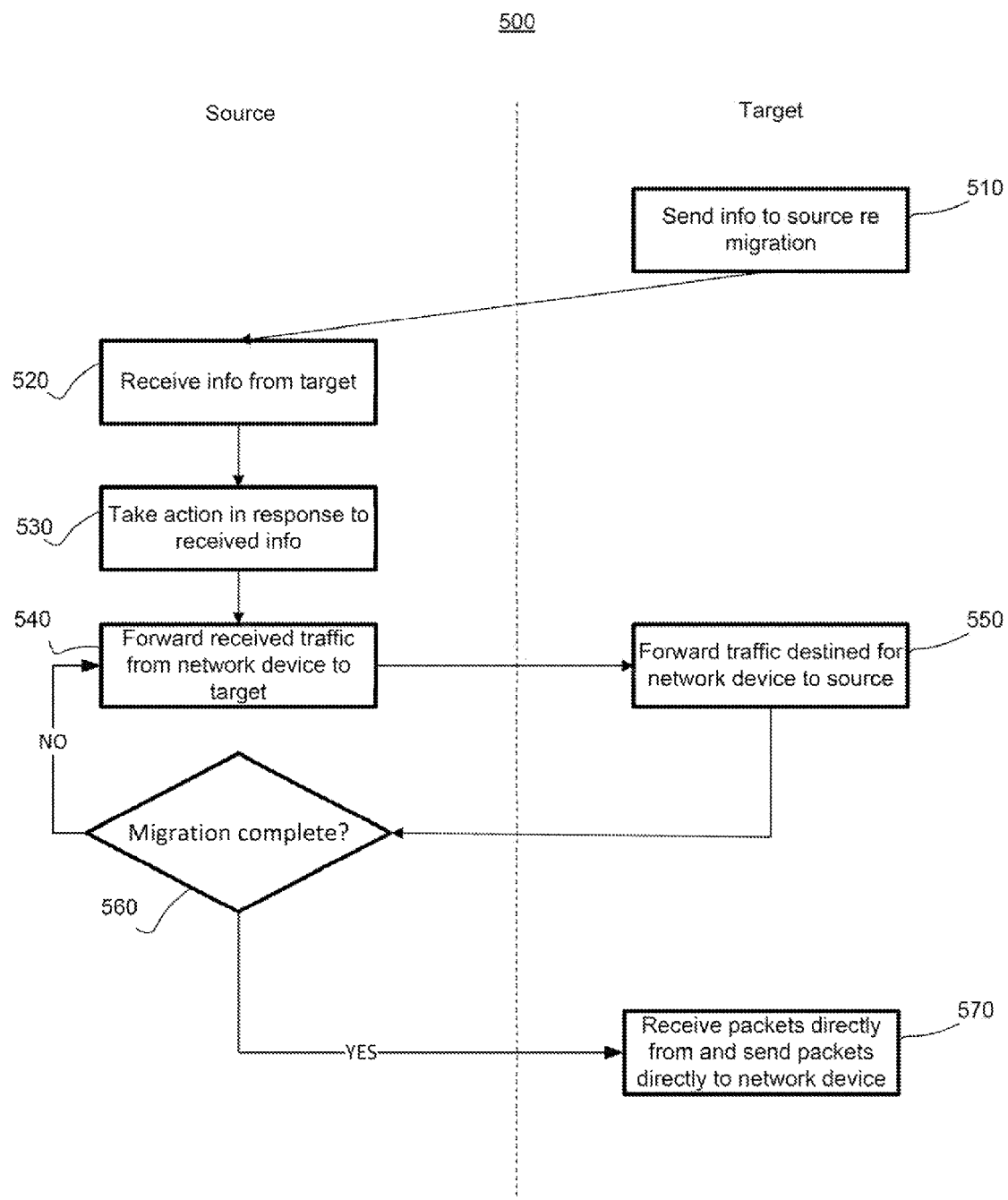
FIG. 5 is a flow diagram of an example method according to aspects of the disclosure.

FIG. 5 provides an example flow diagram illustrating a method 500 for live migration of a virtualized networking stack from a source to a target. It should be understood that the operations involved in the below methods need not be performed in the precise order described. Rather, various operations may be handled in a different order or simultaneously, and operations may be added or omitted.

In block 510, the target sends information to the source regarding the migration. For example, a virtual machine manager (VMM) may be started on the target host to trigger the live migration. The target VMM may contact the source VMM to initiate the migration. According to other examples, the contact may be initiated by the target host, and/or may be directed to the source host or the source guest. Further examples include the source contacting the target, a third party device contacting both the source and the target, or any other mechanism for initiating migration.

In block 520, the source receives the information from the target. For example, the source host, source VMM, and/or source guest may receive the information. In some examples the information may serve as a notification to the guest that it is about to be migrated.

In some examples, the guest on the source host may take an action in response to being notified of the impending migration. One such action may be to change its health state, such as by placing itself into a lame duck mode.

In block 540, the source forwards received traffic from a virtualized or non-virtualized network device, such as another guest, host, or other device, to the target. For example, a network controller may install forwarding rules in a flow table on the source for forwarding the traffic. Similarly, the target may receive the forwarded traffic and forward egress traffic destined for the network device to the source (block 550). As such, the source may receive the traffic forwarded from the target and provide it to the network device.

In block 560, it may be determined whether the migration is complete. Migration may be considered to be complete when, for example, the guest has finished moving from the source to the target, or when the network devices are updated to communicate with the guest on the target host. According to one example, the source host may detect that the guest has been migrated to the target host. As another example, the source may be notified of the completed migration by, for example, the network controller. If migration is not yet complete, the source will continue to perform forwarding between the network device and the target.

If it is determined in block 560 that the migration is complete, in block 550 processing is resumed on the target host and the guest on the target host receives packets directly from the network device. For example, the controller may provide the network device with an updated address for the guest on the target host, thereby enabling the direct communication.

Figure 6:
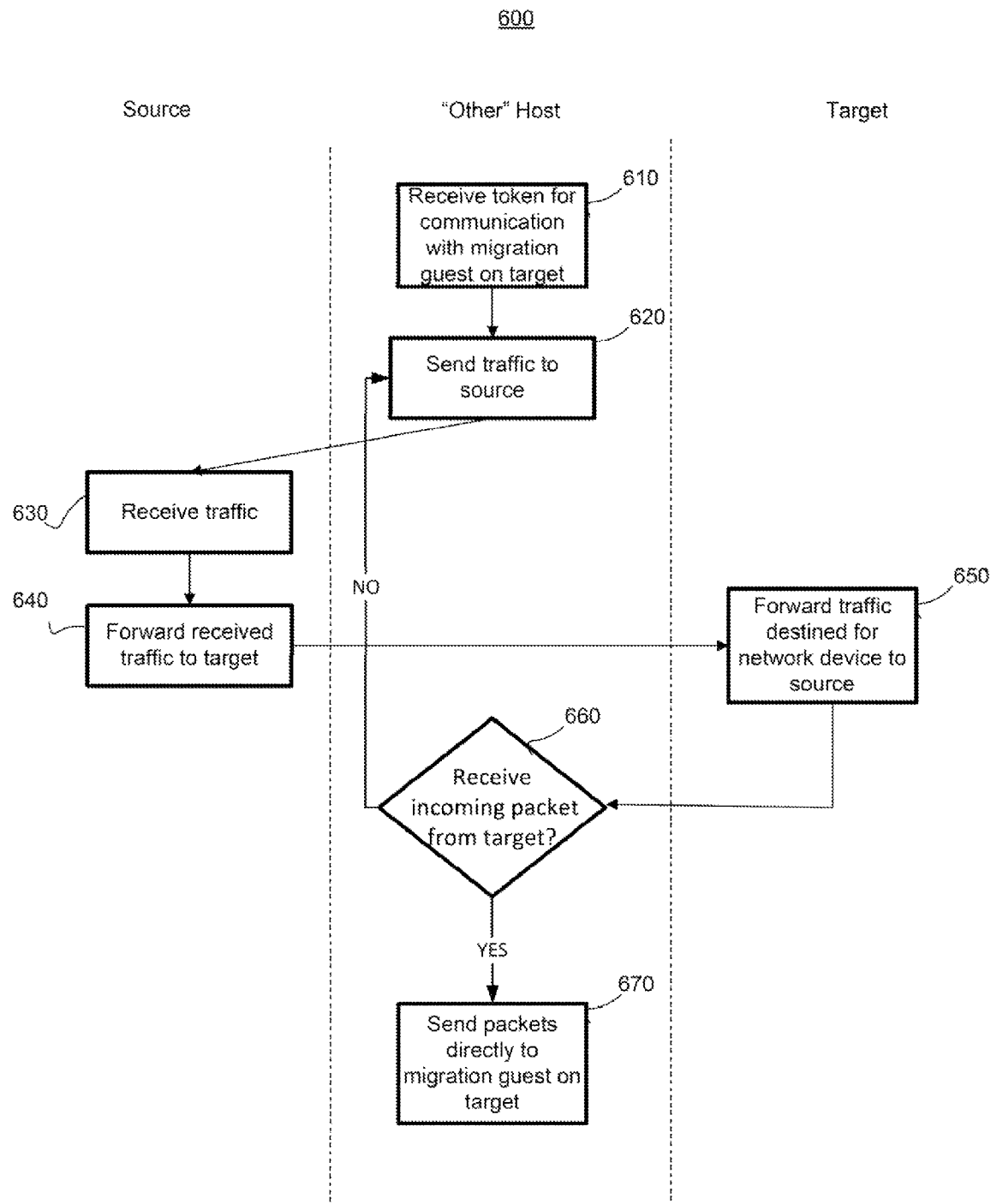
FIG. 6 is a flow diagram of another example method according to aspects of the disclosure.

FIG. 6 provides another example flow diagram illustrating a method 600 for live migration of a virtualized networking stack facilitated by an "other" guest. Similar to the method 500 of FIG. 5, the operations involved in the method 600 may be handled in a different order or simultaneously, and operations may be added or omitted.

In block 610, the other guest receives a token for communicating the migration guest on the target host. The token may be received from a network controller, for example, in response to a lookup request. The token may provide for authenticating and specifying an egress path to the target. For example, the token may be used to authenticate packets received directly from the target, to authenticate packets to be egressed directly to the target, to authenticate packets on the ingress path from the target to the other guest, etc.

In block 620, the other guest sends network traffic to the migration guest on the source host. Such traffic is received at the source (block 630), and forwarded to the target (bock 640).

In block 650, the target receives the forwarded traffic from the source, and also forwards egress traffic destined for the other guest to the source.

In block 660, the other guest determines whether it has received an incoming packet from the migration guest on the target host. If not, the source and target continue to forward traffic to/from the other guest. However, when the other guest receives an incoming packet from the target, this may signal to the other guest that migration is complete.

Accordingly, in block 670, the other guest sends packets directly to the migration guest on the target. For example, the other guest uses the token received from the network controller to authenticate and specify an egress path for the communication.

The method 600 may provide for a more seamless transition, in that the other guest is ready to begin sending packets to the guest on the target once migration is complete. For example, the other guest has the token from the controller for setting up an egress path to the target, and therefore does not have to wait for an update from the controller once migration is complete.

The foregoing techniques are further advantageous in that they provide for moving the active processes of the guest virtual machine from the source host to the target host with minimal impact on the guest. The guest processes may be subject to minimal or no delay or termination. Moreover, exposing the migration guest to the impending live migration, and allowing the migration guest to take action in response, is also advantageous. For example, placing the migration guest into lame duck mode helps to minimize impact on load balancing operations, and therefore allows for continuous running of applications. This may be particularly advantageous for applications that are sensitive to blackout delay.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method of facilitating live migration of a migration guest from a source host to a target host, comprising:
sending, by an other guest on another host, packets to the migration guest on the source host, the packets intended to be forwarded by the source host to the target host, the other guest being a virtual machine;
sending a lookup request from the other guest to a network controller;
receiving at the other guest a token for communicating directly with the migration guest on the target host, wherein the token is sent by the network controller and received at the other guest in response to the lookup request;
receiving, through the source host, packets from the migration guest on the target host;
receiving, at the other guest, one or more packets directly from the migration guest on the target host, and identifying, based on the received one or more packets, that migration is complete; and
sending, from the other guest, after identifying that the migration is complete, packets directly to the migration guest on the target host using the received token to authenticate and specify an egress path from the other guest to the migration guest on the target host.

2. The method of claim 1, further comprising notifying the migration guest of the migration prior to a start of the migration.

3. The method of claim 2, further comprising changing a state of the migration guest in response to the notification.

4. A system, comprising:
a source host including one or more processors;
a migration guest running on the source host;
a target host in communication with the source host; and an other guest in communication with the migration guest on the source host, the other guest being a virtual machine;
wherein:
the other guest is configured to send a lookup request to a network controller, and receive a token for communicating directly with the migration guest on the target host, wherein the token is sent by the network controller and received at the other guest in response to the lookup request;
the source host is configured to forward traffic received from the other guest to the target host, and to forward traffic received from the target host to the other guest;
the target host is configured to send packets directly to the other guest upon completion of migration of the migration guest; and
the other guest is configured to determine when a packet is received directly from the target host, to use the token to authenticate and set up an egress path from the other guest to the target host in response, and to send packets directly to the migration guest on the target host.

5. The system of claim 4, further comprising a network controller, wherein the network controller is configured to provide the token to the other guest for communicating directly with the migration guest on the target host.

6. The system of claim 4, wherein the migration guest is notified of the migration prior to a start of the migration.

7. The system of claim 6, wherein the migration guest is configured to change its state in response to the notification.

8. The system of claim 7, wherein the migration guest places itself into a mode wherein it closes out existing connections and denies future processing requests.

9. The system of claim 6, wherein the migration guest communicates with another system, the communication causing the another system to direct future processing requests to other resources on a network for the duration of the migration.

10. The system of claim 4, wherein the source host is further configured to remove from its forwarding table, after completion of the migration, any rules for forwarding traffic received from the other guest to the target host or for forwarding traffic received from the target host to the other guest.

11. The system of claim 10, wherein the source host waits a predetermined amount of time after completion of the migration before removing the rules from its forwarding table.

12. The system of claim 10, wherein:
at least one of the source host and target host receive a notification that network reprogramming for the migration is complete; and
the rules for forwarding traffic are removed in response to the notification.

13. A method, comprising:
receiving, at a migration guest on a source host, an indication that the migration guest will be migrated from the source host to a target host;
changing, by the migration guest, a state of the migration guest from a first state to a second state in response to receiving the indication, wherein in the second state the migration guest completes existing tasks without accepting new task;
copying the migration guest from the source to the target;
forwarding traffic received from an other guest for the migration guest on the source host to the target host, the other guest being a virtual machine;
forwarding traffic received from the target host on behalf of the migration guest to the other guest;
sending, by the migration guest on the target host, one or more packets directly to the other guest, the one or more packets indicating to the other guest that migration is complete; and
receiving, by the migration guest on the target host, packets directly from the other guest through an egress path specified by a token at the other guest, wherein the token is sent by a network controller and received at the other guest in response to a lookup request.

14. The method of claim 13, wherein changing the state of the migration guest from the first state to the second state further comprises enabling another task to service requests during the migration.

15. The method of claim 13, wherein changing the state of the migration guest from the first state to the second state further comprises removing the migration guest from load-balancing pools.

16. The method of claim 13, further comprising:
determining, by the source host, that traffic forwarded through the source host has dropped to zero;
waiting a predetermined period of time;
deleting rules for forwarding traffic from the source host after the predetermined period of time.

17. The method of claim 13, wherein copying the migration guest from the source to the host is at least partially performed while the migration guest is in the second state.

* * * * *